(12) United States Patent
Fujiwara et al.

(10) Patent No.: US 10,436,509 B2
(45) Date of Patent: Oct. 8, 2019

(54) ELECTRODE ROLL DRYING METHOD, AND ELECTRODE ROLL DRYING DEVICE

(71) Applicant: Nissan Motor Co., Ltd., Yokohama-shi, Kanagawa (JP)

(72) Inventors: Hiroki Fujiwara, Kanagawa (JP); Masahiko Sugiyama, Kanagawa (JP); Seigo Komatsu, Kanagawa (JP); Takeshi Iwata, Kanagawa (JP); Keisuke Uekusa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 209 days.

(21) Appl. No.: 15/024,080

(22) PCT Filed: Oct. 3, 2014

(86) PCT No.: PCT/JP2014/076594
§ 371 (c)(1),
(2) Date: Mar. 23, 2016

(87) PCT Pub. No.: WO2015/053198
PCT Pub. Date: Apr. 16, 2015

(65) Prior Publication Data
US 2016/0216031 A1     Jul. 28, 2016

(30) Foreign Application Priority Data
Oct. 7, 2013   (JP) ................................. 2013-210554

(51) Int. Cl.
*F26B 3/32* (2006.01)
*F26B 5/04* (2006.01)
(Continued)

(52) U.S. Cl.
CPC .................. *F26B 5/04* (2013.01); *F26B 9/06* (2013.01); *F26B 23/04* (2013.01); *H01M 4/04* (2013.01);
(Continued)

(58) Field of Classification Search
CPC .. H01M 4/139; H01M 10/00; H01M 10/0525; H01M 4/8882; H01M 4/0471;
(Continued)

(56) References Cited

U.S. PATENT DOCUMENTS

| | | | | |
|---|---|---|---|---|
| 4,020,563 | A | * 5/1977 | Hoefer | .................... F26B 5/045 |
| | | | | 219/243 |
| 8,950,083 | B2 | * 2/2015 | Fujiwara | ................... F26B 9/06 |
| | | | | 257/57 |
| 2012/0167409 | A1 | 7/2012 | Fujiwara | |

FOREIGN PATENT DOCUMENTS

| | | |
|---|---|---|
| CN | 102072620 A | 5/2011 |
| CN | 102549367 A | 7/2012 |

(Continued)

*Primary Examiner* — John P McCormack
(74) *Attorney, Agent, or Firm* — Global IP Counselors, LLP

(57) ABSTRACT

An electrode roll drying device includes a drying oven housing an electrode roll, an outer-side heater configured to heat the electrode roll, an axial-side heater configured to heat the electrode roll, a pressure reducer configured to reduce internal pressure of the drying oven, a sensor configured to detect a temperature of an outermost portion of the electrode roll, and a control unit configured to control operation of the outer-side heater, the axial-side heater, and the pressure reducer. The control unit is configured to operate the outer-side heater and the axial-side heater to heat the electrode roll from the outer-side and winding core side, and, when the temperature of an outermost portion reaches a target temperature, stop operation of the outer-side heater, operate the pressure reducer to reduce the pressure within the drying (Continued)

oven, and carry out the heating by the axial-side heater and the pressure reduction by the pressure reducer.

20 Claims, 5 Drawing Sheets

(51) Int. Cl.
  *F26B 9/06* (2006.01)
  *H01M 4/04* (2006.01)
  *F26B 23/04* (2006.01)
  *H01M 10/0525* (2010.01)

(52) U.S. Cl.
  CPC ..... *H01M 4/0471* (2013.01); *H01M 10/0525* (2013.01)

(58) Field of Classification Search
  CPC .... F26B 5/00; F26B 5/04; F26B 11/19; F26B 11/049; F26B 9/00; F26B 9/06; F26B 3/20; F26B 23/04; F26B 23/10; F26B 23/06; F26B 25/00; F26B 25/02; F26B 21/06; F26B 7/00; F26B 25/06
  USPC ... 34/92, 202, 215, 402, 403, 406, 412–414, 34/427, 497, 201, 210, 218, 519
  See application file for complete search history.

(56) References Cited

FOREIGN PATENT DOCUMENTS

| | | |
|---|---|---|
| CN | 103206838 A | 7/2013 |
| CN | 103245169 A | 8/2013 |
| JP | 2008-277196 A | 11/2008 |
| JP | 2011-169499 A | 9/2011 |
| JP | 2011-208810 A | 10/2011 |
| JP | 2011-208811 A | 10/2011 |
| JP | 4888575 B2 | 2/2012 |
| JP | 2014-81096 A | 5/2014 |
| KR | 10-2012-0040737 A | 4/2012 |

* cited by examiner

ELECTRODE ROLL DRYING METHOD, AND ELECTRODE ROLL DRYING DEVICE

CROSS-REFERENCE TO RELATED APPLICATIONS

This application is a U.S. National Stage Application of International Application No. PCT/JP2014/076594, filed Oct. 3, 2014, which claims priority to Japanese Patent Application No. 2013-210554 filed in the Japan Patent Office on Oct. 7, 2013, the contents of each of which is hereby incorporation herein by reference.

BACKGROUND

Field of Invention

The present invention relates to an electrode roll drying method, and an electrode roll drying device.

Background Information

When water adheres to an electrode during the manufacturing of a lithium-ion secondary battery, the battery performance deteriorates. In order to prevent water from adhering to an electrode during manufacturing, in general, batteries are manufactured in a dry room. There is the risk of water adhering to an electrode other than when manufacturing the battery, such as when transporting or storing the electrode. For this reason, in general, an electrode roll configured from an electrode base material wound into a roll around a winding core is dried prior to assembling the battery.

Winding pressure is high at the winding core side of the electrode roll, and causing the water to escape is difficult. Thus, the present Applicant has proposed a technique to dry an electrode roll by heating from the winding core side. (Refer to Japanese Laid Open Patent Application 2011-169499).

SUMMARY

In recent years, there has been a tendency to increase the overall length of the electrode base material wound per electrode roll, to improve productivity, by reducing the frequency of replacing the electrode roll when assembling the battery. Along with the above, the outer diameter of the electrode roll increases. When the outer diameter of the electrode roll increases, the time required for transmitting the necessary heat to the outer portion in the radial direction of the electrode roll for drying increases, with only heat conduction from the winding core in a radially outward direction. Consequently, there is the risk of drying in the outer-side portion of the electrode roll being insufficient.

Thus, an object of the present invention is to provide an electrode roll drying method, and an electrode roll drying device which embodies the method, that can shorten the drying time of the electrode roll, by giving suitable conditions for when combining heating from the winding core side of the electrode roll and heating from the outer-side of the electrode roll.

An electrode roll drying method of the present invention which achieves the above object is to heat the electrode roll formed from an electrode base material wound around a winding core from both the outer and winding core sides in a drying oven. In addition, if the temperature of the outermost portion of the electrode roll reaches a target temperature that is lower than that is allowed as the upper limit temperature at the outermost portion, heating from the outer-side is stopped, the pressure within the drying oven is reduced, and heating from the winding core side and pressure reduction is carried out.

An electrode roll drying device of the present invention which achieves the above object comprises a drying oven, an outer-side heater, an axial-side heater, a pressure reducer, a sensor, and a control unit. The drying oven houses an electrode roll configured from an electrode base material wound around a winding core. The outer-side heater heats the electrode roll housed in the drying oven from the outer-side. The axial-side heater heats the electrode roll housed in the drying oven from the winding core side. The pressure reducer reduces the internal pressure of the drying oven. The sensor detects the temperature of the outermost portion of the electrode roll. The control unit controls the operation of the outer-side heater, the axial-side heater, and the pressure reducer based on the temperature of the outermost portion of the electrode roll detected by the sensor. The control unit operates the outer-side heater and the axial-side heater and heats the electrode roll from both the outer and winding core sides. If the temperature of the outermost portion of the electrode roll reaches a target temperature that is lower than that is allowed as the upper limit temperature at the outermost portion, the control unit stops the operation of the outer-side heater, and operates the pressure reducer to reduce the pressure within the drying oven. Heating by the axial-side heater and pressure reduction by the pressure reducer is thereby carried out.

BRIEF DESCRIPTION OF THE DRAWINGS

Referring now to the attached drawings which form a part of this original disclosure.

DETAILED DESCRIPTION OF THE EMBODIMENTS

Figure 1:
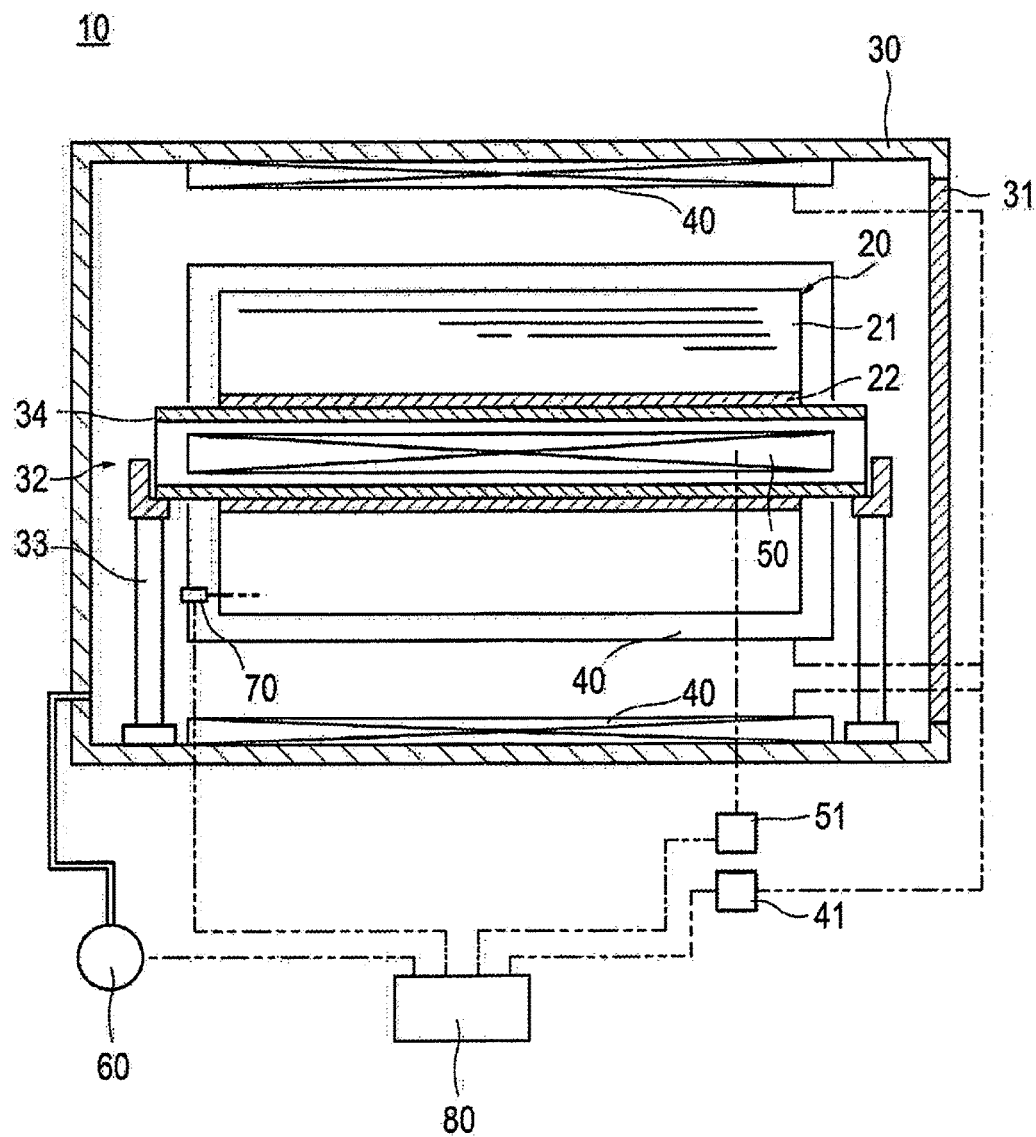
FIG. 1 is a schematic block diagram showing an electrode roll drying device according to an embodiment of the present invention.

An embodiment of the present invention will be explained below, with reference to the appended drawings. In the explanations of the drawings, the same elements are given the same codes, and overlapping explanations are omitted. The dimensional ratios in the drawings are exaggerated for convenience of explanation, and are different from the actual ratios.

Figure 2:
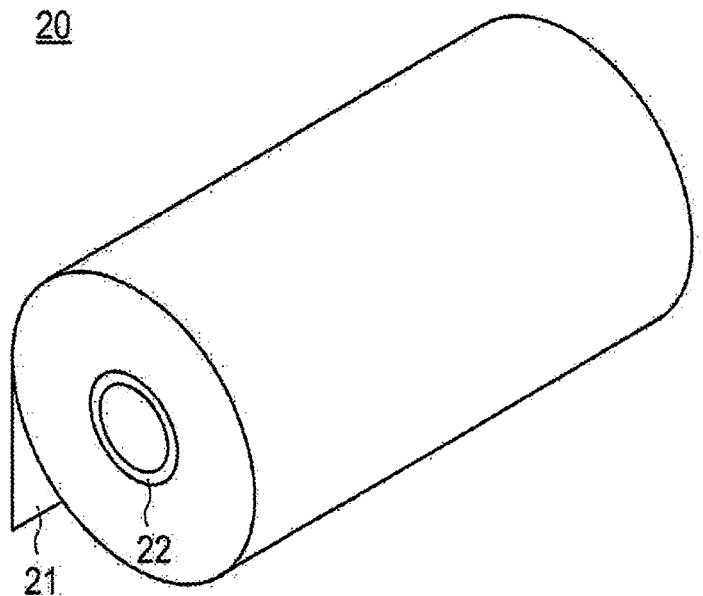
FIG. 2 is a perspective view showing an electrode roll.
Figure 3:
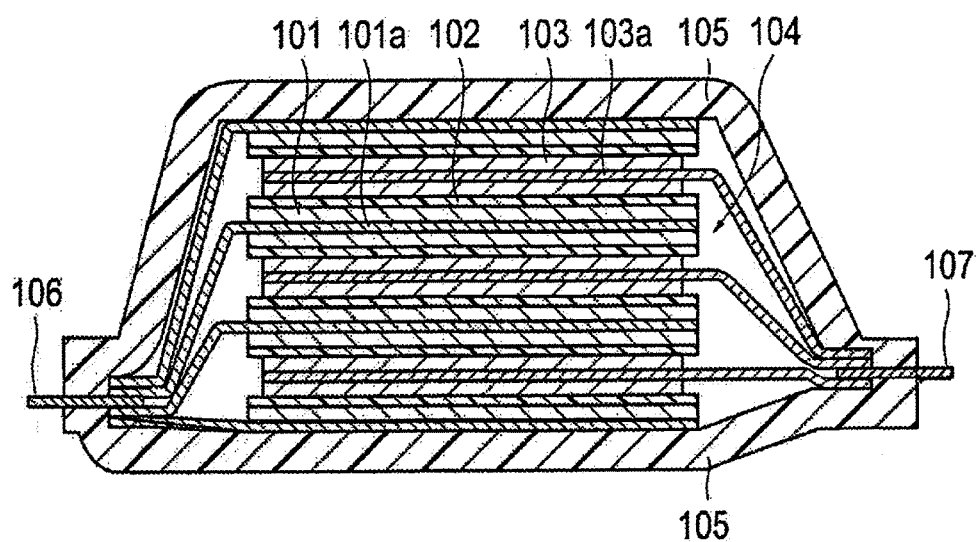
FIG. 3 is a schematic cross-section view showing an example of an electrical device to which an electrode formed by cutting an electrode base material of an electrode roll is applied.

FIG. 1 is a schematic block diagram showing a drying device 10 of an electrode roll 20 according to an embodiment of the present invention, FIG. 2 is a perspective view showing an electrode roll 20, and FIG. 3 is a schematic cross-section view showing an example of an electrical device to which an electrode formed by cutting an electrode base material 21 of an electrode roll 20 is applied.

To give an outline with reference to FIG. 1, a drying device 10 of an electrode roll 20 comprises a drying oven 30, an outer-side heater 40, an axial-side heater 50, a pressure reducer 60, a sensor 70, and a control unit 80. The drying oven 30 houses an electrode roll 20 configured from an electrode base material 21 wound around a winding core 22. The outer-side heater 40 heats the electrode roll 20 housed in the drying oven 30 from the outer-side. The axial-side heater 50 heats the electrode roll 20 housed in the drying oven 30 from the winding core 22 side. The pressure reducer 60 reduces the internal pressure of the drying oven 30. The sensor 70 detects the temperature of the outermost portion of the electrode roll 20. The control unit 80 controls the operation of the outer-side heater 40, the axial-side heater 50, and the pressure reducer 60 based on the temperature of the outermost portion of the electrode roll 20 detected by the sensor 70. The control unit 80 operates the outer-side heater 40 and the axial-side heater 50 to heat the electrode roll 20 from both the outer and winding core 22 sides. If the temperature of the outermost portion of the electrode roll 20 reaches a target temperature that is lower than that is allowed as the upper limit temperature at the outermost portion, the control unit 80 stops the operation of the outer-side heater 40, and operates the pressure reducer 60 to reduce the pressure within the drying oven 30. With the above, heating by the axial-side heater 50 and pressure reduction by the pressure reducer 60 is carried out. The details are described below.

An electrode roll 20 is configured from a long electrode base material 21 wound around a hollow winding core 22, as also illustrated in FIG. 2. The electrode base material 21 is configured from active material layers formed on both sides of a current collector. An electrode is formed by the electrode base material being 21 sent out from the winding core 22, and cut to a predetermined length. There is the risk of water in the air condensing and adhering to the electrode base material 21, when carrying or storing the electrode roll 20. When water adheres to an electrode, the battery performance deteriorates. Since lithium-ion secondary batteries used for automobiles are relatively large, and water adherence amount is also likely to become large, measures against water adherence is especially needed. Drying the power generating element after forming the power generating element comprising an electrode is also conceivable. However, since various battery elements are mixed in power generating elements, there are cases in which the necessary heat to remove water cannot be applied to the electrode and water removal becomes insufficient. Thus, drying in the form of the electrode roll 20 prior to cutting the electrode base material 21 is desirable.

The drying oven 30 comprises an openable door part 31, and the electrode roll 20 is taken in and out through the opened door part 31. The drying oven 30 is configured from a vacuum chamber in which airtightness is heightened so that air does not flow into the inner portion after pressure reduction. An inner portion of the drying oven 30 comprises a support member 32 for supporting the housed electrode roll 20. The support member 32 comprises a support leg 33 which is fixed to the floor surface of the drying oven 30, and a support sieve part 34 which is detachably mounted to the support leg 33. The support sieve part 34 is freely insertable into the winding core 22 of the electrode roll 20. The support member 32 supports the electrode roll 20 by mounting the support sieve part 34, which is inserted into the winding core 22, to the support leg 33.

The outer-side heater 40 is disposed to a wall surface of the drying oven 30 which faces the surface of the electrode roll 20, and transfers heat towards the core portion from the surface of the electrode roll 20. In the case of rotationally driving and drying an electrode roll 20, the number of outer-side heaters 40 to be installed can be reduced.

The axial-side heater 50 is disposed on the axial center of the support sieve part 34, and transfers heat towards the surface from the core portion of the electrode roll 20.

The outer-side heater 40 and the axial-side heater 50 are configured from electric heaters. The outer-side heater 40 is connected to a power supply unit via a switch 41 for turning conduction on and off. The switching between heating start and heating stop of the outer-side heater 40 is carried out by operating the switch 41. The axial-side heater 50, in the same manner, is connected to a power supply unit via a switch 51 for turning conduction on and off. The switching between heating start and heating stop of the axial-side heater 50 is carried out by operating the switch 51.

The pressure reducer 60 is configured from a vacuum pump, and discharges the air in the inner portion of the drying oven 30 to the outer portion. The pressure reducer 60 reduces the pressure in the drying oven 30 from an atmospheric pressure state to a vacuum state. The vacuum level, although not particularly limited, is, for example, about 1 Torr (133.32 Pa), which is about the same as a general purpose vacuum oven. By reducing the pressure within the drying oven 30 and lowering the boiling point of water, water evaporation of the electrode roll 20 is accelerated, and the electrode roll 20 can be dried faster.

A general temperature sensor such as a thermocouple can be used for the sensor 70. The sensor 70 is attached to the surface of the electrode roll 20, and detects the temperature of the outermost portion of the electrode roll 20. A non-contact type thermometer such as an infrared radiation thermometer can be used instead of a contact type thermocouple, for the sensor 70.

The control unit 80 comprises a CPU, a RAM, a ROM, a timer, and the like, and carries out the drying of the electrode roll 20 by executing with the CPU a control program stored in the ROM. A signal related to the temperature of the outermost portion of the electrode roll 20 detected by the sensor 70 is inputted to the control unit 80. A control signal which carries out the switching between heating start and heating stop of the switch 41 for the outer-side heater 40, a control signal which carries out the switching between heating start and heating stop of the switch 51 for the axial-side heater 50, and a control signal which carries out the switching between operation start and operation stop of the pressure reducer 60 are outputted from the control unit 80.

FIG. 3 shows a lithium-ion secondary battery 100 as an example of an electrical device. The lithium-ion secondary battery 100 is configured from a power generating element 104, formed from a negative electrode 101, a separator 102, and a positive electrode 103 layer stacked in sequence, which is sealed by an exterior material 105. The negative electrode 101 is configured from an active material layer formed on both sides of a current collector 101a. The positive electrode 103 is configured from an active material layer formed on both sides of a current collector 103a. The separator 102 configures an electrolyte layer by impregnation of electrolytes. The current collector 101a of the negative electrode 101 is extended and connected to a negative electrode tab 106 for extracting electric power. The current collector 103a of the positive electrode 103 is extended and connected to a positive tab 107 for extracting electric power.

Portions of tabs 106 and 107 protrude to the outer portion from the exterior material 105. The exterior material 105 is configured from two sheets of superposed laminate film, the peripheral edge portions of which are thermally fused. In the manufacturing process of a lithium-ion secondary battery 100, the negative electrode 101 is manufactured by sending out and then cutting a required length of the electrode roll 20, which is the electrode base material 21 for the negative electrode 101 wound into a roll. The positive electrode 103 is manufactured by sending out and then cutting a required length of the electrode roll 20, which is the electrode base material 21 for the positive electrode 103 wound into a roll. Winding the electrode roll 21 into a roll is in consideration of the convenience of transport, and the like.

Next, the effects of the present embodiment will be described.

Figure 4:
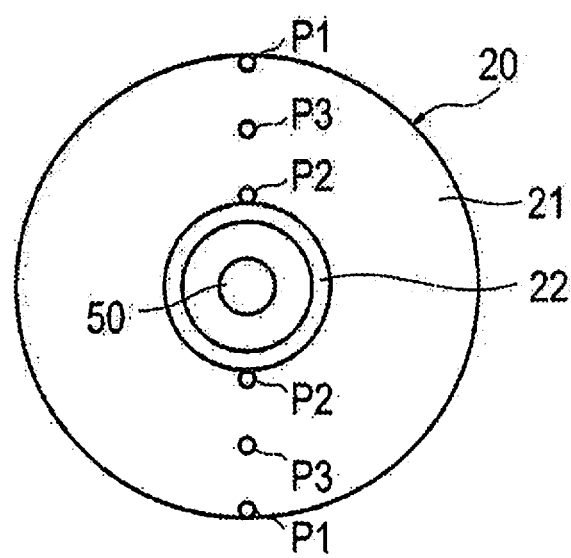
FIG. 4 is a schematic view showing the position to which thermocouples are set in a drying test of an electrode roll.
Figures 5A, 5B:
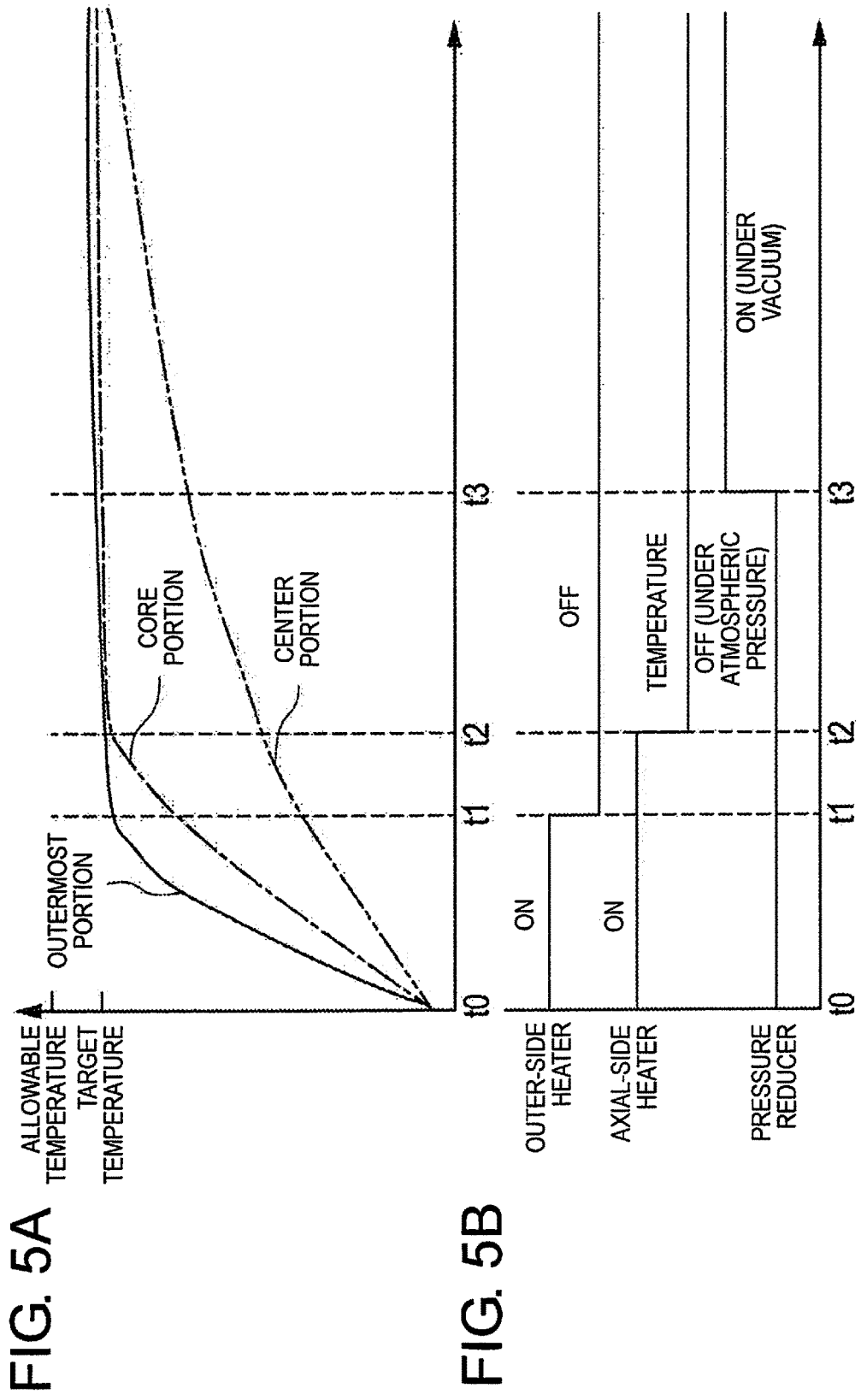
FIG. 5A is a graph showing the temperature change of an electrode roll during a drying operation.
FIG. 5B is a time-chart showing the operation status of an outer-side heater, an axial-side heater, and a pressure reducer.

FIG. 4 is a schematic view showing the position to which a thermocouple is set in a drying test of an electrode roll 20, FIG. 5A is a graph showing the temperature change of an electrode roll 20 during a drying operation, and FIG. 5B is a time-chart showing the operation status of an outer-side heater 40, an axial-side heater 50, and a pressure reducer 60.

With reference to FIG. 4, in the drying test of the electrode roll 20, thermocouples are set to position P1 at the outermost portion of the electrode roll 20, position P2 at the core portion of the electrode roll 20, and position P3 at a center portion between both positions. The thermocouple is set by being inserted into the radially inward direction from the end surface in the radial direction of the electrode roll 20, and the heating effect from the end surface in the radial direction is reduced. Temperature is measured at two points that are symmetrical with respect to the axial center, and the average temperature of the two points is employed as the temperature of each of the positions, P1, P2, and P3. In FIG. 5A, the temperature of the outermost portion of the electrode roll 20 is shown by the solid line, the temperature of the core portion is shown by the dashed-dotted line, and the temperature of the center portion is shown by the chained double dash line.

As described above, to improve productivity, the outer diameter of the electrode roll 20 is increased, and the time needed for transmitting the necessary heat to the outer portion in the radial direction of the electrode roll 20 for drying the water becomes longer, with only the heat conduction from the winding core to the radially outward direction. Consequently, there is the risk of the drying in the outer-side portion of the electrode roll 20 being insufficient.

When the outer diameter of the electrode roll 20 is increased, it has been found that transmitting heat in the radial direction of the electrode roll 20, under atmospheric pressure, prior to transitioning to vacuum drying, is most efficient, for supplying the heat required for the drying of the electrode roll 20.

However, when heat is transmitted to the electrode roll 20 from both the outer and winding core 22 sides, heat is transmitted in the radial direction of the electrode roll 20. Heat is lastly transmitted to the center portion of the electrode roll 20. If the heat transmitted from both the outer and winding core 22 sides is increased, in order to transmit heat to the center portion of the electrode roll 20, the heat-resistant temperature of the electrode base material 21 will be exceeded, at locations close to the heat source. For this reason, the temperature of the outermost portion of the electrode roll 20 or the temperature of the core portion cannot be raised unnecessarily, by applying heat from both the outer and winding core 22 sides.

In the present embodiment, the electrode roll 20 is dried by the following procedure, in order to shorten the drying time of the electrode roll 20, by giving suitable conditions for when combining heating from the winding core 22 side of the electrode roll 20 and heating from the outer-side of the electrode roll 20.

First, the electrode roll 20 is housed in the drying oven 30, the door part 31 is closed, and the drying oven 30 is made to be in a sealed state.

With reference to FIG. 5(B), the control unit 80 turns on both the switch 41 for the outer-side heater 40 and the switch 51 for the axial-side heater 50. Heating of the electrode roll 20 from the outer-side is started by the outer-side heater 40. Heating of the electrode roll 20 from the winding core 22 side is started by the axial-side heater 50. The control unit 80 keeps the operation of the pressure reducer 60 off.

With reference to FIG. 5A, if the electrode roll 20 is heated from both the outer and winding core 22 sides, the heat is transmitted in the radial direction of the electrode roll 20. The temperature of the electrode roll 20 is raised in the order of: the outermost portion; the core portion; and the center portion. Since heat is applied to the electrode roll 20 from both the outer and winding core 22 sides in the radial direction, the heat necessary when drying the electrode roll 20 can be applied evenly and in a short period of time. Growth in the winding direction occurs to the electrode base material 21 due to thermal expansion. A small space is generated between the layers of the wound electrode base material 21. Water evaporates through the small space.

Each element of the electrode base material 21 has a heat-resistant temperature, in relation to the material, and the like. For this reason, in the electrode roll 20, an allowable temperature (about 120° C.-140° C.) as the upper limit temperature is defined. In the drying operation of the electrode roll 20, a target temperature lower than the allowable temperature is set as the temperature at the outermost portion of the electrode roll 20. The target temperature, although not particularly limited, is, for example, set to a temperature about 15 degrees lower than the allowable temperature.

The control unit 80, at time t=t1, detects that the temperature of the outermost portion of the electrode roll 20 has reached the target temperature, then, turns off the switch 41 for the outer-side heater 40, stops the heating from the outer-side of the electrode roll 20, reduces the pressure within the drying oven 30, and carries out pressure reduction and heating from the winding core 22 side.

The pressure reduction within the drying oven 30 may be started at the same time as stopping the heating from the outer-side of the electrode roll 20, but in the present embodiment, the pressure within the drying oven 30 is reduced after a waiting time set in advance has elapsed after the heating from the outer-side of the electrode roll 20 is stopped (time t=t1). Therefore, the control unit 80, at the time of turning off the switch 41 for the outer-side heater 40, keeps the operation of the pressure reducer 60 off. The control unit 80, after stopping the operation of the outer-side heater 40 and stopping the heating from the outer-side (time t=t1), activates a timer, and starts counting the waiting time set in advance. When the waiting time has elapsed, the control unit 80 operates the pressure reducer 60 and reduces the pressure within the drying oven 30. By reducing the pressure of the drying oven 30, the boiling point of water is lowered, water evaporation of the electrode roll 20 is accelerated, and the electrode roll 20 can be dried more quickly.

By continuing to apply heat from the axial-side during the waiting time prior to switching to vacuum drying, the heat that is necessary to dry the electrode roll 20 to the center portion thereof can be applied in a relatively short period of time after switching to vacuum drying. As a result, the temperature of the center portion of the electrode roll 20 is raised in a relatively short period of time, and drying of the electrode base material 21, which is located in the center portion, where drying is difficult, can be carried out quickly and sufficiently.

The waiting time is determined by trial and error in advance, since the waiting time changes according to the material from which the electrode base material 21 is configured. To give an example, the waiting time shall be the time until the temperature of the center portion of the electrode roll 20 reaches a temperature, for example, about 30 degrees lower than the allowable temperature, when only the heating from the winding core 22 side of the electrode roll 20 is continued.

With reference to FIG. 5A and FIG. 5B, the temperature of the core portion, and the temperature of the center portion of the electrode roll 20 are raised even after the heating of the electrode roll 20 from the outer-side is stopped (time t=t1), since the heating of the electrode roll 20 from the winding core 22 side is continued.

The control unit 80, at time t=t2, detects that the temperature of the core portion of the electrode roll 20 has reached the target temperature, then, transitions to a temperature adjustment control in which the switch 51 for the axial-side heater 50 is controlled to turn on/off, and adjusts the temperature so that the temperature of the core portion of the electrode roll 20 is maintained at the target temperature. Heat applied from the outer-side of the electrode roll 20 is transmitted radially inward, heat applied from the winding core 22 side of the electrode roll 20 is transmitted radially outward, and the temperature of the center portion of the electrode roll 20 is raised.

The control unit 80, at time t=t3, counts a waiting time set in advance (=t3−t1), then, operates the pressure reducer 60 to reduce the pressure within the drying oven 30, and transitions to vacuum drying. Prior to switching to vacuum drying, a waiting time is set, and the heat necessary for evaporating the water in the center portion of the electrode roll 20 is applied under atmospheric pressure. Thus, in the subsequent vacuum drying, the temperature of the center portion of the electrode roll 20 can be sufficiently raised. Additionally, by reducing the pressure of the drying oven 30, the boiling point is lowered, and water evaporation is accelerated. Accordingly, the electrode roll 20 can be dried quickly.

The control unit 80 continues the vacuum drying for a predetermined time. The above predetermined time is also determined in advance by trial and error. The predetermined time is set to a time sufficient for the temperature of the center portion of the electrode roll 20 to also reach the target temperature, and the center portion to dry.

When the drying of the electrode roll 20 ends, the operation of the pressure reducer 60 is stopped, the pressure within the drying oven 30 is returned to atmospheric pressure, and the electrode roll 20 is cooled. The dried electrode roll 20 is transported from the drying oven 30 to a dry room, and a battery is manufactured.

When actually producing batteries, thermocouples are set to position P1 at the outermost portion, and position P2 at the core portion of the electrode roll 20, and the electrode roll 20 is dried, while the operation of the outer-side heater 40 and the axial-side heater 50 is controlled based on the outermost portion and core portion temperatures.

As described above, in the present embodiment, the control unit 80 operates the outer-side heater 40 and the axial-side heater 50 to heat the electrode roll 20 from both the outer and winding core 22 sides, and, if the temperature of the outermost portion of the electrode roll 20 reaches a target temperature that is lower than that is allowed as the upper limit temperature at the outermost portion, stops the operation of the outer-side heater 40, operates the pressure reducer 60 to reduce the pressure within the drying oven 30, and carries out the heating by the axial-side heater 50 and the pressure reduction by the pressure reducer 60. According to this configuration, the outermost portion of the electrode roll 20 is controlled so as not to exceed the allowable temperature, and, by reducing the pressure of the drying oven 30, water evaporation of the electrode roll 20 is accelerated, and the electrode roll 20 can be dried quickly.

The control unit 80 operates the pressure reducer 60 to reduce pressure within the drying oven 30 after a waiting time set in advance has elapsed after the operation of the outer-side heater 40 is stopped and heating from the outer-side is stopped. According to this configuration, by continuing to apply heat from the axial-side during the waiting time prior to switching to vacuum drying, the heat that is necessary to dry the electrode roll 20 to the center portion thereof can be applied in a relatively short period of time after switching to vacuum drying. As a result, the temperature of the center portion of the electrode roll 20 is raised in a relatively short period of time, and drying of the electrode base material 21, which is located in the center portion, where drying is difficult, can be carried out quickly and sufficiently.

The pressure reducer 60 reduces the pressure within the drying oven 30 from an atmospheric pressure state to a vacuum state. According to this configuration, by the pressure reduction of the drying oven 30, the boiling point of water is lowered, water evaporation of the electrode roll 20 is accelerated, and the electrode roll 20 can be dried more quickly.

The outer-side heater 40 and the axial-side heater 50 are configured from electric heaters, and the switching between heating start and heating stop is carried out with a switch. According to this configuration, the switching responsiveness of heat/stop can be improved.

MODIFIED EXAMPLE

Figure 6:
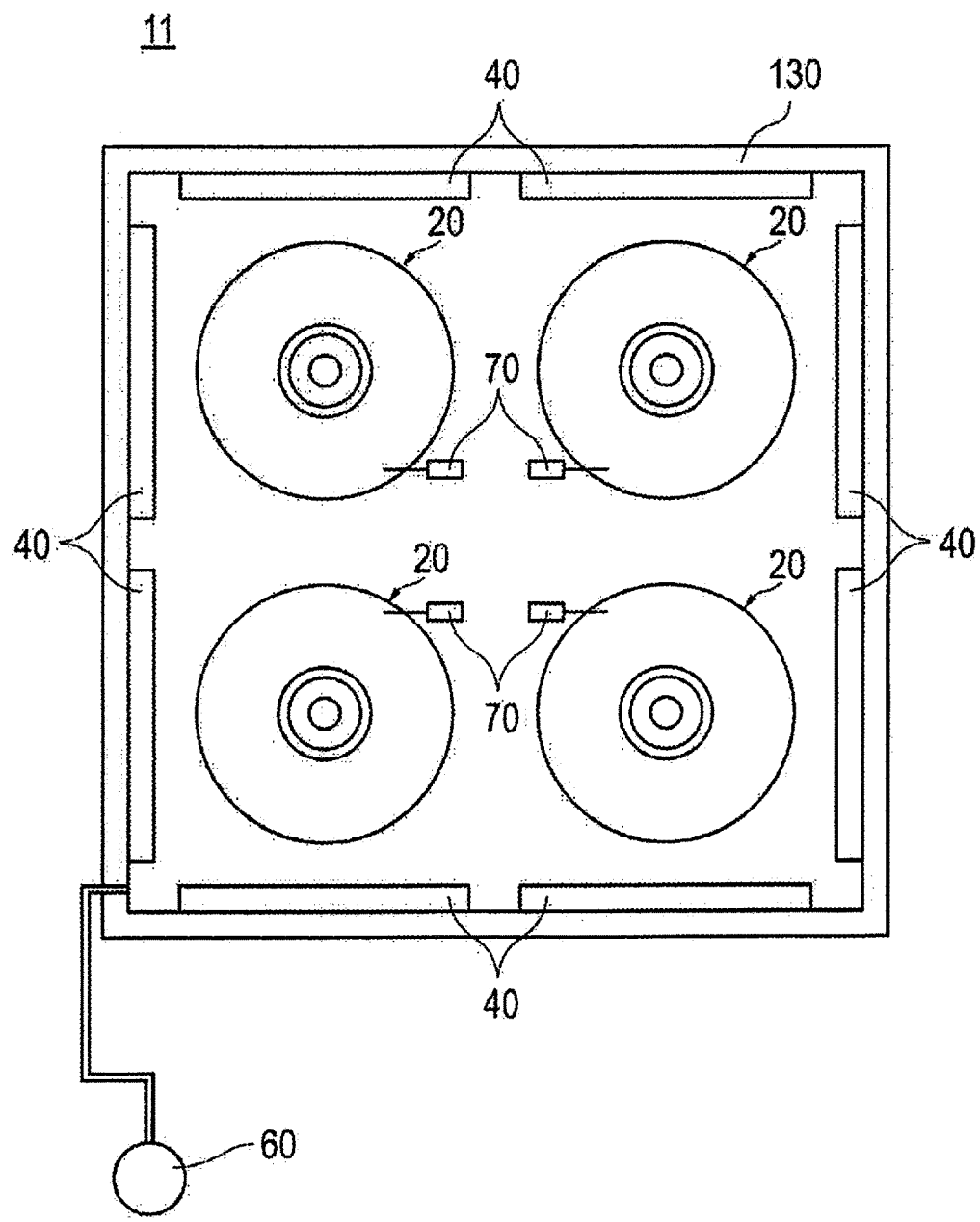
FIG. 6 is a cross-sectional view showing an electrode roll drying device according to a modified example.

FIG. 6 is a cross-sectional view showing a drying device 11 of an electrode roll 20 according to a modified example. Members common with the embodiment are given the same codes, and the explanations thereof are omitted.

The drying device 11 of an electrode roll 20 according to the modified example differs from the embodiment in which one electrode roll 20 is housed in a single drying oven 30 in the point that a plurality of electrode rolls 20 are housed in a single drying oven 130.

The drying oven 130 is configured from two stages, upper and lower, to be capable of housing a total of four (two on each stage) electrode rolls 20. Eight outer-side heaters 40 are mounted to a wall surface, and an axial-side heater 50 is disposed within each axial-center of the four electrode rolls 20. A sensor 70 for detecting the temperature of the outermost portion is mounted to each electrode roll 20. Additionally, a control unit 80 controls the drying for each of the plurality of electrode rolls 20 housed in a single drying oven 130. In the same manner as in the case of the embodiment, the control unit 80 operates the outer-side heater 40 and the axial-side heater 50 to heat the electrode roll 20 from both the outer and winding core 22 sides, and, if the temperature of the outermost portion of the electrode roll 20 reaches a target temperature, stops the operation of the outer-side heater 40, operates the pressure reducer 60 to reduce the pressure within the drying oven 130, and carries out the heating by the axial-side heater 50 and the pressure reduction by the pressure reducer 60.

Even if a plurality of electrode rolls 20 are housed in a single drying oven 130, the outermost portion of each of the electrode rolls 20 is controlled so as not to exceed the allowable temperature, and, by reducing the pressure of the drying oven 130, water evaporation of each of the electrode rolls 20 is accelerated, and each of the electrode rolls 20 can be dried quickly.

The drying oven 130 may be configured to be capable of housing a plurality of electrode rolls 20 arranged on the same axis. In this case as well, the outermost portion of each of the electrode rolls 20 is controlled so as not to exceed the allowable temperature, and, by reducing the pressure of the drying oven 130, water evaporation of each of the electrode rolls 20 is accelerated, and each of the electrode rolls 20 can be dried quickly.

The invention claimed is:

1. An electrode roll drying method for an electrode roll in a drying oven, the method comprising:
    heating an electrode base material wound around a winding core from both an outer-side and a winding core side, the heating from the outer-side being performed using an outer-side heater and the heating from the winding core side being performed using an axial-side heater; and
    when a temperature of an outermost portion of the electrode roll reaches a target temperature that is lower than a predetermined upper limit temperature at the outermost portion:
    stopping the heating from the outer-side by the outer-side heater;
    continuing the heating from the winding core side by the axial-side heater;
    reducing pressure within the drying oven; and
    heating from the winding core side after the pressure within the drying oven has been reduced.

2. The electrode roll drying method according to claim 1, wherein
    the reducing pressure within the drying oven includes reducing pressure after a predetermined time has elapsed after the stopping the heating from the outer-side.

3. The electrode roll drying method according to claim 1, wherein
    the reducing pressure within the drying oven includes reducing pressure from an atmospheric pressure state to a vacuum state.

4. The electrode roll drying method according to claim 1, wherein
    each of the outer-side heater and the axial-side heater is an electric heater, and
    switching between the heating and the stopping the heating is carried out with a switch.

5. The electrode roll drying method according to claim 1, further comprising
    the electrode roll is one of a plurality of electrode rolls housed in the drying oven, and
    the drying is carried out for each of the plurality of electrode rolls.

6. The electrode roll drying method according to claim 2, wherein
    the reducing pressure within the drying oven includes reducing pressure from an atmospheric pressure state to a vacuum state.

7. The electrode roll drying method according to claim 2, wherein
    each of the outer-side heater and the axial-side heater is an electric heater, and
    switching between the heating and the stopping the heating is carried out with a switch.

8. The electrode roll drying method according to claim 3, wherein
    each of the outer-side heater and the axial-side heater is an electric heater, and
    switching between the heating and the stopping the heating is carried out with a switch.

9. The electrode roll drying method according to claim 2, further comprising
    the electrode roll is one of a plurality of electrode rolls housed in the drying oven, and
    the drying is carried out for each of a plurality of electrode rolls.

10. The electrode roll drying method according to claim 3, further comprising
    the electrode roll is one of a plurality of electrode rolls housed in the drying oven, and
    the drying is carried out for each of a plurality of electrode rolls.

11. An electrode roll drying device comprising:
    a drying oven housing an electrode roll formed from an electrode base material wound around a winding core;
    an outer-side heater configured to heat the electrode roll housed in the drying oven from an outer-side;
    an axial-side heater configured to heat the electrode roll housed in the drying oven from a winding core side;
    a pressure reducer configured to reduce internal pressure of the drying oven;
    a sensor configured to detect a temperature of an outermost portion of the electrode roll; and
    a control unit configured to control operation of the outer-side heater, the axial-side heater, and the pressure reducer, based on the temperature of the outermost portion of the electrode roll detected by the sensor,
    the control unit configured to operate the outer-side heater to heat the electrode roll from the outer-side and to operate the axial-side heater to heat the electrode roll from the winding core side, and further configured to, when the temperature of the outermost portion of the electrode roll reaches a target temperature that is lower than a predetermined upper limit temperature at the outermost portion, stop operation of the outer-side heater, continue operation of the axial-side heater after the operation of the outer-side heater has been stopped, operate the pressure reducer to reduce the pressure within the drying oven, and carry out the heating of the electrode roll from the winding core side by the axial-side heater after the pressure has been reduced by the pressure reducer.

12. The electrode roll drying device according to claim 11, wherein
    the control unit is configured to operate the pressure reducer to reduce pressure within the drying oven after a predetermined time has elapsed after operation of the outer-side heater is stopped and heating from an outer-side is stopped.

13. The electrode roll drying device according to claim 11, wherein the pressure reducer is configured to reduce pressure within the drying oven from an atmospheric pressure state to a vacuum state.

14. The electrode roll drying device according to claim 11, wherein
each of the outer-side heater and the axial-side heater is an electric heater, and a switch is configured to switch between heating and stopping heating.

15. The electrode roll drying device according to claim 11, wherein
the electrode roll is one of a plurality of electrode rolls disposed in the drying oven, and
the control unit is configured to control drying for each of the plurality of electrode rolls.

16. The electrode roll drying device according to claim 12, wherein
the pressure reducer is configured to reduce pressure within the drying oven from an atmospheric pressure state to a vacuum state.

17. The electrode roll drying device according to claim 12, wherein
each of the outer-side heater and the axial-side heater is an electric heater, and a switch is configured to switch between heating and stopping heating.

18. The electrode roll drying device according to claim 13, wherein
each of the outer-side heater and the axial-side heater is an electric heater, and a switch is configured to switch between heating and stopping heating.

19. The electrode roll drying device according to claim 12, wherein
the electrode roll is one of a plurality of electrode rolls disposed in the drying oven, and
the control unit is configured to control drying for each of the plurality of electrode rolls.

20. The electrode roll drying device according to claim 13, wherein
the electrode roll is one of a plurality of electrode rolls disposed in the drying oven, and
the control unit is configured to control drying for each of the plurality of electrode rolls.

* * * * *